United States Patent Office 3,337,640
Patented Aug. 22, 1967

3,337,640
PROCESS FOR THE PREPARATION OF 3-[1-(1,2,3,4-TETRAHYDRONAPHTHYL)]PROPANOL-1
Klaus Thewalt, 6 Holzkampstrasse, Witten (Ruhr), Germany
No Drawing. Filed Feb. 18, 1963, Ser. No. 259,375
Claims priority, application Germany, Mar. 8, 1962, C 26,437
4 Claims. (Cl. 260—618)

The present invention relates to a process for the preparation of 3-[1-(1,2,3,4-tetrahydronaphthyl)]propanol-1 by the cyclical dehydration of water from 7-phenyl-heptanediol-1,4 by means of so-called polyphosphoric acids having a $P_2O_5$ content of from 82 to 84%.

It is already known to prepare substituted tetrahydrofuran compounds having the general formula

wherein R represents any desired organic residue, by dehydration of substituted 1,4 diols having the general formula

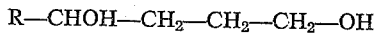

R—CHOH—CH$_2$—CH$_2$—CH$_2$—OH wherein R represents any desired aliphatic or aromatic residue, with metal oxides of the third and sixth groups of the periodic system, such as $Al_2O_3$, $MoO_3$ and $WO_3$, at temperatures around 250° C.

It has now been found that 3-[1-(1,2,3,4-tetrahydronapthyl)]propanol-1 may be prepared in high yield by dehydrating 7-phenyl-heptanediol-1,4 with from three to five times the amount thereof of so-called polyphosphoric acids having a $P_2O_5$ content of from 82 to 84% at temperatures of from 90 to 110° C., preferably 100° C. and that the 3-[1-(1,2,3,4-tetrahydronaphthyl)]propanol-1 can be recovered by distillation after dilution in water and extraction with organic solvents.

During the dehydration under the conditions indicated, the 3-[1-(1,2,3,4-tetrahydronaphthyl)]propanol-1 is formed with cleavage of the secondary hydroxyl group and of a hydrogen atom from the phenyl nucleus according to the following equation:

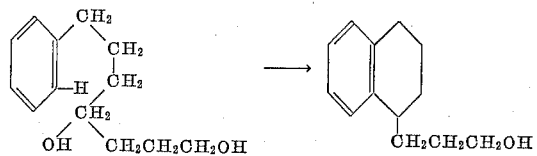

The reaction in accordance with the present invention takes place under mild conditions and allows for the preparation of the end product in high yield. The process according to the present invention makes it possible to prepare the 3-[1-(1,2,3,4-tetrahydronaphthyl)]propanol-1 which was heretofore difficultly accessible, in a very simple manner.

The polyphosphoric acids used in the reaction according to the present invention may be recovered from the reaction solution, which is diluted with water, according to known processes.

The 7-phenyl-heptanediol-1,4 may be prepared to be used as starting material, for example, in the manner described in patent application Ser. No. 259,376 filed Feb. 18, 1963.

The 3-[1-(1,2,3,4-tetrahydronaphthyl)]propanol-1 produced according to the present invention may be employed, for example, as an esterification component in the production of plasticizers and also as an intermediate product in the plastics industry.

Accordingly, it is an object of the present invention to provide a simple process for the production of 3-[1-(1,2,3,4-tetrahydronaphthyl)]propanol-1.

Other objects of the present invention will become apparent as the description thereof proceeds hereinbelow where the example serves to further illustrate the invention without limiting the same.

Example 250 g. of 7-phenyl-heptanediol-1,4 are stirred for one hour together with 1,000 g. of technical polyphosphoric acid at 100 to 110° C. with the exclusion of water. The reaction mixture is then introduced into approximately the same amount of water and extracted with organic solvents, for example, ether. The wash water serves for the recovery of the phosphoric acid used, while the 3-[1-(1,2,3,4-tetrahydronaphthyl)]propanol-1 passes over at a second boiling point of 143 to 144° C. after distillation of the ether. The yield is 160 g. and amounts to 70% of the theoretical.

While the invention has been described with reference to the example thereof, it will be understood that changes may be made in carrying out the process without departing from the scope of the invention, and it is intended that all matter contained in the above description shall be interpreted as illustrative and not in a limiting sense.

I claim:
1. A process for the preparation of 3-[1-(1,2,3,4-tetrahydronaphthyl)]propanol-1 which comprises dehydrating 7-phenyl-heptanediol-1,4 with at least 300% by weight of a polyphosphoric acid containing a major proportion of $P_2O_5$ at a temperature of between approximately 90 and 110° C.

2. A process for the preparation of 3-[1-(1,2,3,4-tetrahydronaphthyl)]propanol-1 which comprises dehydrating 7-phenyl-heptanediol-1,4 with at least 300% by weight of a polyphosphoric acid having a $P_2O_5$ content of from 82 to 84% at a temperature of between approximately 90 and 110° C.

3. A process for the preparation of 3-[1-(1,2,3,4-tetrahydronaphthyl)]propanol-1 which comprises dehydrating 7-phenyl-heptanediol-1,4 with 300 to 500% by weight of a polyphosphoric acid having a $P_2O_5$ content of from 82 to 84% at a temperature of between approximately 90 and 110° C.

4. The process of claim 3, further comprising the steps of diluting the reaction mixture with water to solubilize the phosphoric acid, extracting the resultant solution with an organic solvent to remove the 3-[1(1,2,3,4-tetrahydronaphthyl)]propanol-1 therefrom, and distilling the obtained extract to recover said 3-[1-(1,2,3,4-tetrahydronaphthyl)]propanol-1.

References Cited

UNITED STATES PATENTS 2,558,520   6/1951   Hoyt et al. _____ 260—603

OTHER REFERENCES

Roblin et al.: J. Am. Chem. Soc., vol. 57, pp. 151–9 (1935).

LEON ZITVER, Primary Examiner.

M. B. ROBERTO, T. G. DILLAHUNTY,
Assistant Examiners.